(12) United States Patent
Thiruvengada et al.

(10) Patent No.: US 8,823,508 B2
(45) Date of Patent: Sep. 2, 2014

(54) USER INTERFACES FOR ENABLING INFORMATION INFUSION TO IMPROVE SITUATION AWARENESS

(75) Inventors: Hari Thiruvengada, Plymouth, MN (US); Tom Plocher, Hugo, MN (US); Paul Derby, Lubbock, TX (US); Henry Chen, Beijing (CN); Saad J. Bedros, West St. Paul, MN (US)

(73) Assignee: Honeywell International Inc., Morristown, NJ (US)

(*) Notice: Subject to any disclaimer, the term of this patent is extended or adjusted under 35 U.S.C. 154(b) by 565 days.

(21) Appl. No.: 13/017,928

(22) Filed: Jan. 31, 2011

(65) Prior Publication Data

US 2012/0194336 A1 Aug. 2, 2012

(51) Int. Cl.
| | | |
|---|---|---|
| *G08B 25/00* | (2006.01) | |
| *G08B 23/00* | (2006.01) | |
| *H04W 24/00* | (2009.01) | |
| *G06F 3/041* | (2006.01) | |
| *G08B 13/196* | (2006.01) | |
| *H04N 7/18* | (2006.01) | |

(52) U.S. Cl.
CPC .... *G08B 13/19645* (2013.01); *G08B 13/19682* (2013.01); *G08B 13/19697* (2013.01); *H04N 7/183* (2013.01)

USPC .......... 340/525; 340/517; 340/520; 340/523; 340/524; 455/456.1; 345/173

(58) Field of Classification Search
None
See application file for complete search history.

(56) References Cited

U.S. PATENT DOCUMENTS

| | | | | |
|---|---|---|---|---|
| 5,650,800 | A * | 7/1997 | Benson | 345/173 |
| 6,529,137 | B1 * | 3/2003 | Roe | 340/691.1 |
| 6,798,342 | B2 * | 9/2004 | Addy | 340/539.1 |
| 6,809,642 | B1 * | 10/2004 | Brenner | 340/506 |
| 7,342,489 | B1 * | 3/2008 | Milinusic et al. | 340/506 |
| 8,013,730 | B2 * | 9/2011 | Oh et al. | 340/521 |
| 8,095,150 | B2 * | 1/2012 | Dunko | 455/456.1 |
| 2005/0219048 | A1 * | 10/2005 | Kimmel et al. | 340/511 |
| 2006/0265664 | A1 * | 11/2006 | Simons et al. | 715/772 |
| 2009/0295738 | A1 * | 12/2009 | Chiang | 345/173 |

* cited by examiner

*Primary Examiner* — George Bugg
*Assistant Examiner* — Renee Dorsey
(74) *Attorney, Agent, or Firm* — Schwegman Lundberg & Woessner, P.A.

(57) ABSTRACT

A security system is configured to display a representation of an area on a display unit, receive input from a plurality of different types of sensors that are positioned within the area, display a plurality of icons on the display unit, wherein the plurality of icons represents the locations of the plurality sensors in the area, and display in a panel on the display unit output from the plurality of sensors.

18 Claims, 7 Drawing Sheets

USER INTERFACES FOR ENABLING INFORMATION INFUSION TO IMPROVE SITUATION AWARENESS

TECHNICAL FIELD

The present disclosure relates to a system and method to improve situation awareness using information infusion.

BACKGROUND

The security of a facility can be challenging to maintain when a security guard or other person does not have the proper situation awareness of the facility. That is, the security guard may be unable to perceive events occurring within a facility, comprehend the meaning of those events, and project the status of those events into the future. There are several reasons why current security management software may disrupt a security guard's situation awareness of a facility or campus. First, the facility or campus may be very large, and the user may not be able to see the entire facility or campus floor plan in detail on the display all at once. Second, users may have to sort through long, non-descriptive lists of possible sensors (e.g., surveillance camera video feed) in order to view the intended sensor data. In addition, the user may only be able to view the real-time data from one sensor at a time. Third, information about alarms may be located within a different location in the application causing the user to navigate away from the view of the facility. Fourth, information about the equipment (e.g., parameters, type, installation date, etc.) or about other users of the system (e.g., description of those at access points) is oftentimes unavailable. The user may have to look in resources outside of the security management software to find this information. All of these problems cause a user to divert his or her attention away from the security of a facility or campus, thereby inhibiting the user's situation awareness of the facility or campus.

DETAILED DESCRIPTION

One or more embodiments address the above-identified issues by allowing a user to constantly maintain situation awareness of an entire facility or campus. The user is able to view and monitor multiple sensor data streams, gain information about sensors, and view alarms while maintaining his or her attention on the system's display screen. Embodiments provide the ability to navigate and zoom a two dimensional or three dimensional map of a facility or campus. To navigate the floor plan, the user can pan along the floor plan by dragging his or her finger along the touch screen or clicking and dragging with a mouse cursor. Prior security management applications have inhibited the user from viewing all of this information at once.

Additionally, one or more embodiments offer a unique solution to the above-identified issues and allow the user to maintain constant situation awareness of a facility within one application. Such a security application can be used to monitor the security of a small to large facility or campus, to respond to alarms while continuously monitoring the facility, and to control actions within the facility from a map of the facility or campus displayed on a screen.

More specifically, in an embodiment, a security system infuses information in order to improve situation awareness. The system includes processors, a display unit, and communication paths. The processors are configured to display a representation of an area on the display unit, receive input from a plurality of different types of sensors that are positioned within the area, and display a plurality of icons on the display unit. The plurality of icons represents the locations of the plurality of sensors in the area. The processors are further configured to display in a panel on the display unit output from the plurality of sensors.

Figure 1:
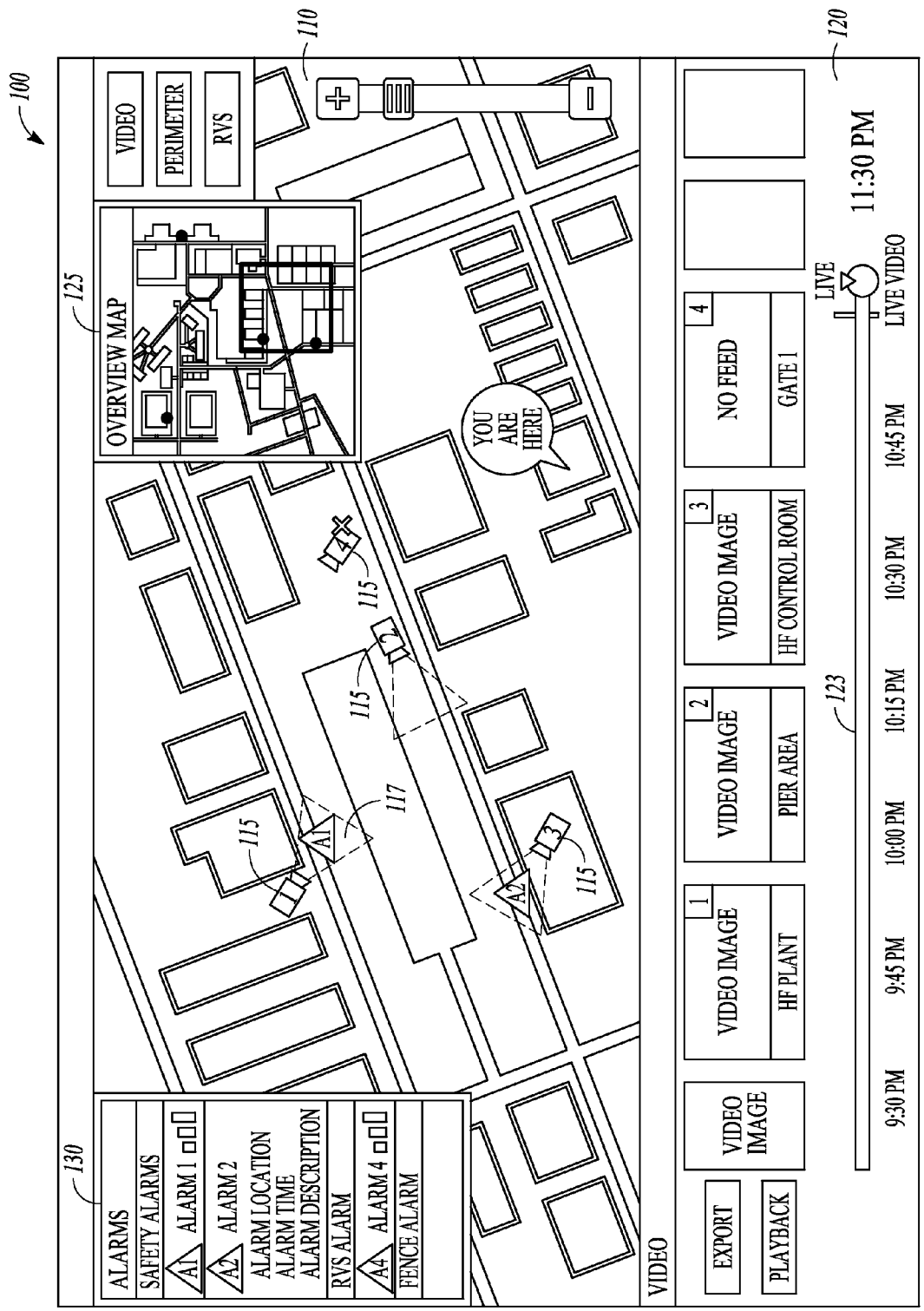
FIG. 1 illustrates an example embodiment of an output on a display unit of a security monitoring system.

FIG. 1 illustrates an example embodiment of an output 100 on a display unit of a security monitoring system. The output 100 includes a main display 110. The main display 110 can include one or more of an aerial photograph or view, a map, a plan view, and a three dimensional representation. The main display 110 includes icons 115 that represent the location, orientation, and field of view of the sensors in the monitored area. The field of view 117 of the sensor can be outlined or displayed on the output. If a sensor is not properly functioning, an "x" or other symbol can be placed over or next to the icon to indicate the problem to the user.

The output 100 further includes a panel display 120, which displays a live feed or recorded data of each of the plurality of sensors. Video windows on the panel display 120, or video windows in the main display 110, can allow a user to easily export segments of selected videos into a packaged format. Such video windows can also allow a user to switch between playback and live modes to review/replay past events. In an embodiment, the system can receive input from the user that allows the user to scroll horizontally through the plurality of sensor outputs in the panel 120. The user can scroll horizontally through the camera feeds if all of the feeds are not present in the video panel 120 (because the panel 120 may not be large enough to display all of the video feeds at one time). The main display 110 further includes an overview map 125 that illustrates the location in a larger area of the area displayed on the main display 110. That is, an overview map provides a "big picture" view, and the main display 110 provides a detailed view, and moving the viewing area in the overview map pans the site map to maintain overall orientation for the user.

A video window in the panel 120 or main display 110 can be used to view a standard and customized configuration. A camera icon can be dragged and dropped into the video panel 120 to view its current video feed. The user also has the option to select multiple video feeds to be shown at once on the screen. To continuously monitor these feeds, the user is able to drag-and-drop camera icons to the panel 120. Once the user drops the icon(s) in the panel 120, the video feed will be displayed. In addition to the display of sensor output in panel 120, the system can receive input from a user regarding an icon on the main display 110, create a window in the main display 110 for output of a sensor associated with the selected icon, and display in the window and/or panel output from the sensor associated with the icon. A time bar 123 can be displayed within the panel 120.

A user can navigate throughout the area on the main display 110, and also go beyond the main display to any area in the overview area 125. In an embodiment, when a user ventures beyond the main display area 110, the main display area 110 is readjusted to display the area indicated by the user.

The sensors 115 can be virtually any type of sensor such as a video sensing device, a perimeter sensor, a radar-based sensor, and a motion sensor. In the case of a video sensing device, the system can display the pan, tilt, zoom, the field of view, and the height of the video sensing device when a security person or other user selects the icon associated with the video sensing device.

A user is able to manipulate various parameters of the sensors (e.g., pan/tilt/zoom, lock/unlock). While zooming a video sensing device, the user is given feedback on the absolute zoom level (e.g., 1×-36×). As the parameters of the sensor change, the sensor icon will also change. For example, if the icon is representing a surveillance camera, then the icon will display the field-of-view of the video feed. That is, an embodiment will show the user what area (such as by outlining the area) of the map is visible from the current camera feed.

An embodiment is further configured to receive input from the user, and modify one or more parameters of a sensor based on the user input. The input can be received from the user by first receiving the particular sensor to be modified via the user clicking on the icon for that sensor, and then receiving input from that user regarding the parameter to change for that sensor. For example, in the case of a video sensing device, the user can change the zoom of the video sensing device. In another embodiment, widgets can be used, and the user can simply point to a particular area of a touch sensitive screen, and any sensors in the area selected by the user will orient towards the indicated area. A widget can be designed in a way that a single touch screen device or mouse/keyboard can be used to seamlessly interact with the application.

FIG. 1 further illustrates an alarm panel 130. The system is configured to receive input from a user regarding an alarm on the alarm panel, and the system indicates the location of the alarm in the area. The system can further center the main display 110 of the representation of the area around the location of the alarm. An alarm can be tied to the display panel for a particular sensor, so that selecting the alarm in the alarm panel automatically navigates the user to the location of the alarm on the main display 110. The output from any other sensor that is tied to the alarm can also be displayed on the panel 120. An embodiment also has the ability to view a list of alarms and notifications at the same time as navigating the facility floor plan. The alarm panel can be hidden when not needed. The alarms and notifications can be categorized based on their criticality and type. That is, alarm groupings can be done by sensor categories. Alternatively, alarms can be grouped by the time of occurrence of events, and events can be correlated with sensor and event location.

To find out more information about an alarm, a user can touch or click on the alarm in the alarm panel. Information about the alarm (e.g., criticality, the alarm location, the person who activated the alarm, and the date and time of the alarm) would be displayed. To locate this alarm on the floor plan, the user would touch or click the alarm box and drag it to the floor plan. "Dropping" the alarm box on the floor plan centers the floor plan on the alarm location, and causes the sensors that created the alarm to be displayed on the display 110. This action activates sensors associated with the alarm. Similarly, a user could touch or click on an alarm icon on the main map or the overview map.

The overview map 125, the alarm panel 130, and other windows within the main display 110 can be moved and docked to other locations in the main display 110. These dockings can be the inside perimeter of the main display 110 or any other location within the main display 110.

The system can include a plurality of security apparatuses. Such security apparatuses can include doors and gates, all capable of being locked or secured in some manner. The system can receive input from a user that relates to a path through the area and through one or more security apparatuses. The input can be either a list of the security apparatuses involved, or a path through the area via touch screen input or mouse input. A user can input a particular time for securing or unsecuring each security apparatus, or the system can calculate a particular time for each security apparatus based on the path chosen by the user. The system can then either secure and/or unsecure each security apparatus based on the input of the user. Additionally, embodiments are able to automate the scheduling of a walking route through the facility by the user inputting the source and destination of the route. In doing this, doors interfering with the walking path can automatically lock to prohibit others from intersecting with the walking route.

The system is further configured to receive input from a user, and to place one or more sensors into a group based on the input from the user. The sensors can also be grouped into meaningful custom configurations to detect overlapping events, which allows the elimination of false alarms since if two or more sensors detect an event, it is likely a true event and not a false alarm.

Figure 2:
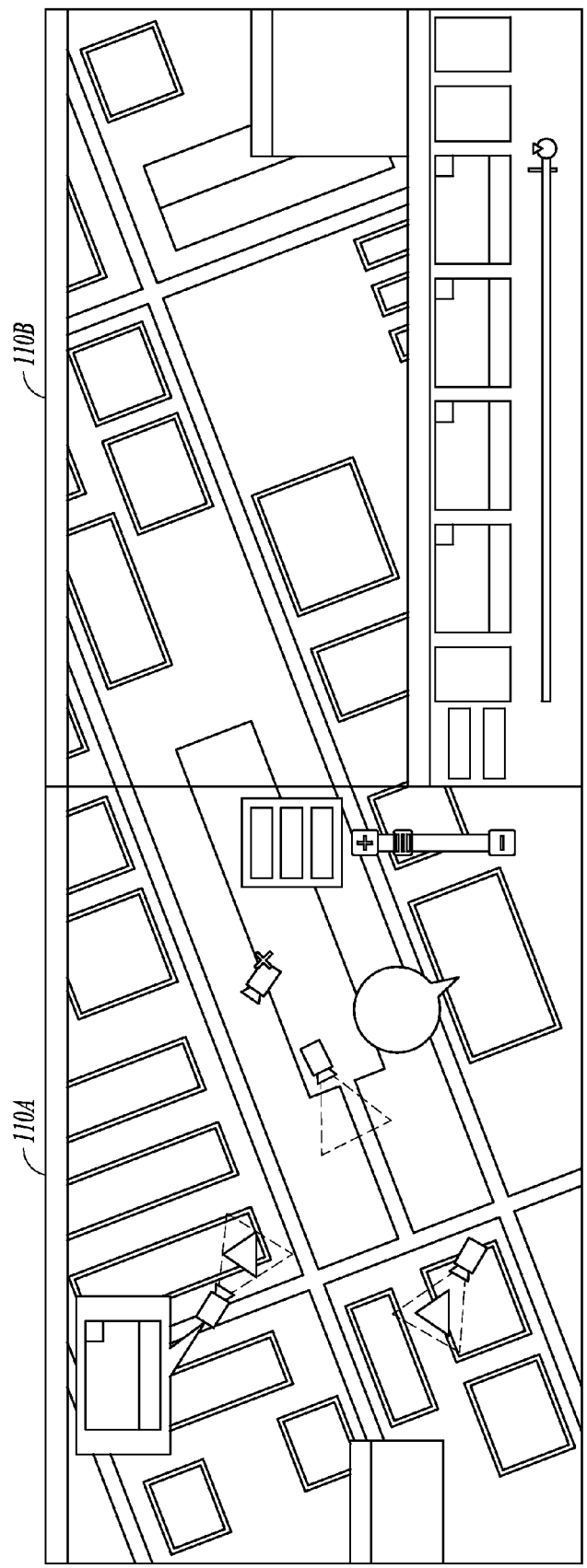
FIG. 2 illustrates an example embodiment of an output on multiple displays of a security monitoring system.
Figure 3:
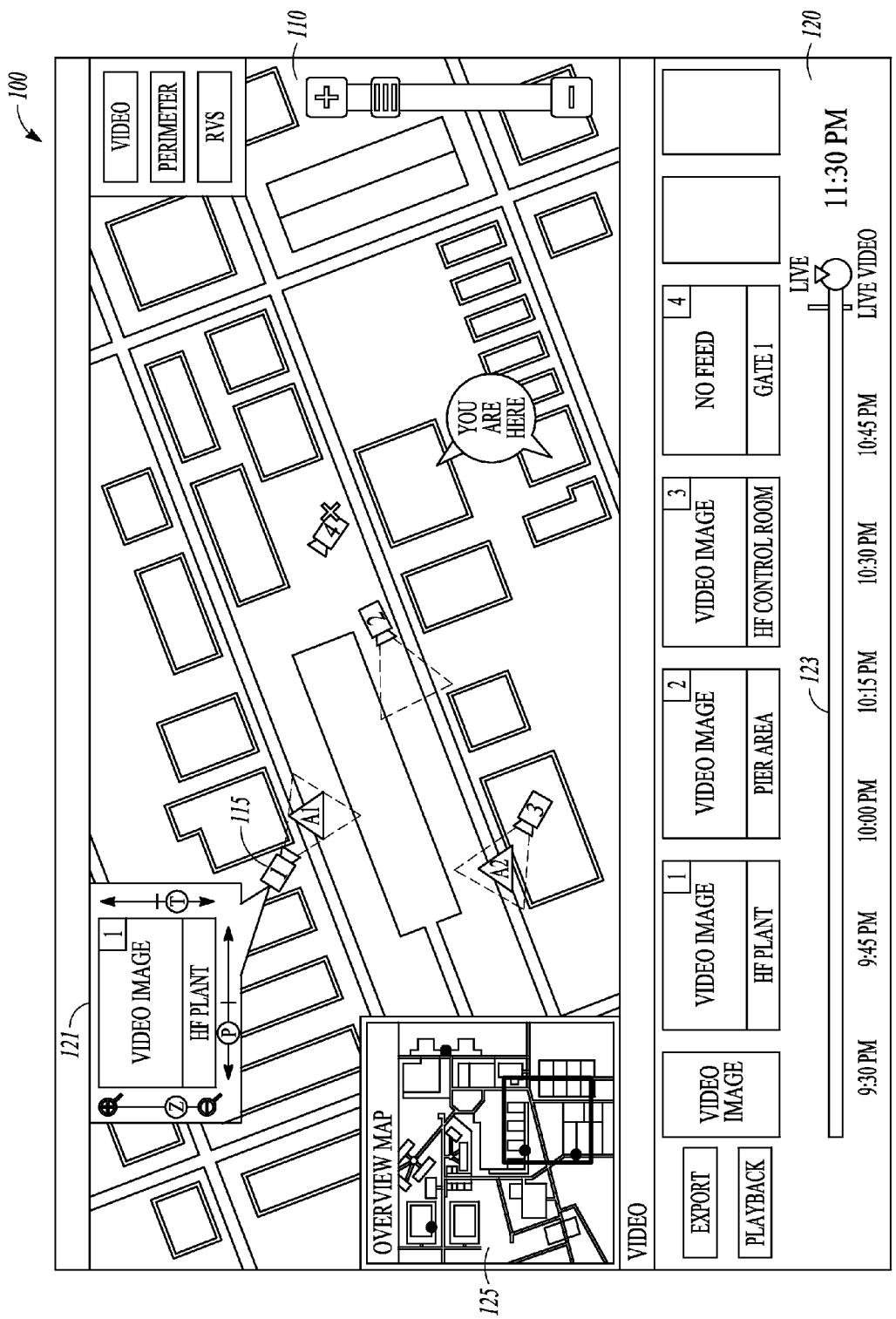
FIG. 3 illustrates an example embodiment of an output of a security monitoring system wherein a video feed of a sensor is displayed next to the icon of the sensor.

FIG. 2 illustrates an output for a security monitoring system on multiple display units 110A and 110B. In an embodiment, as illustrated in FIG. 2, the portions of the outputs that are joined are contiguous. FIG. 3 illustrates that a user can click on an icon 115 and a data stream 121 for that sensor will be streamed to a display box next to the sensor icon.

Figure 4:
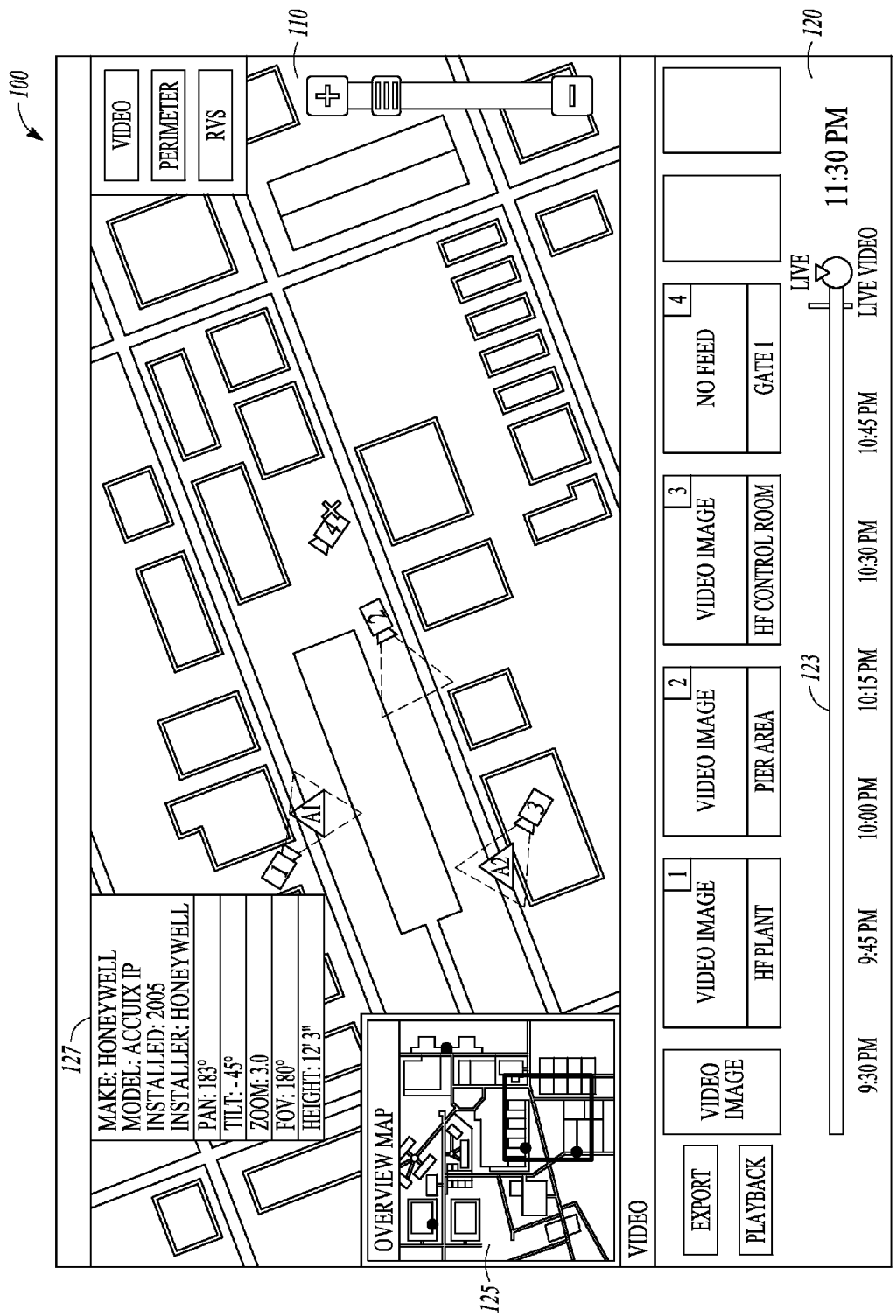
FIG. 4 illustrates an example embodiment of an output of a security monitoring system wherein parameters of a sensor are displayed.
Figure 5:
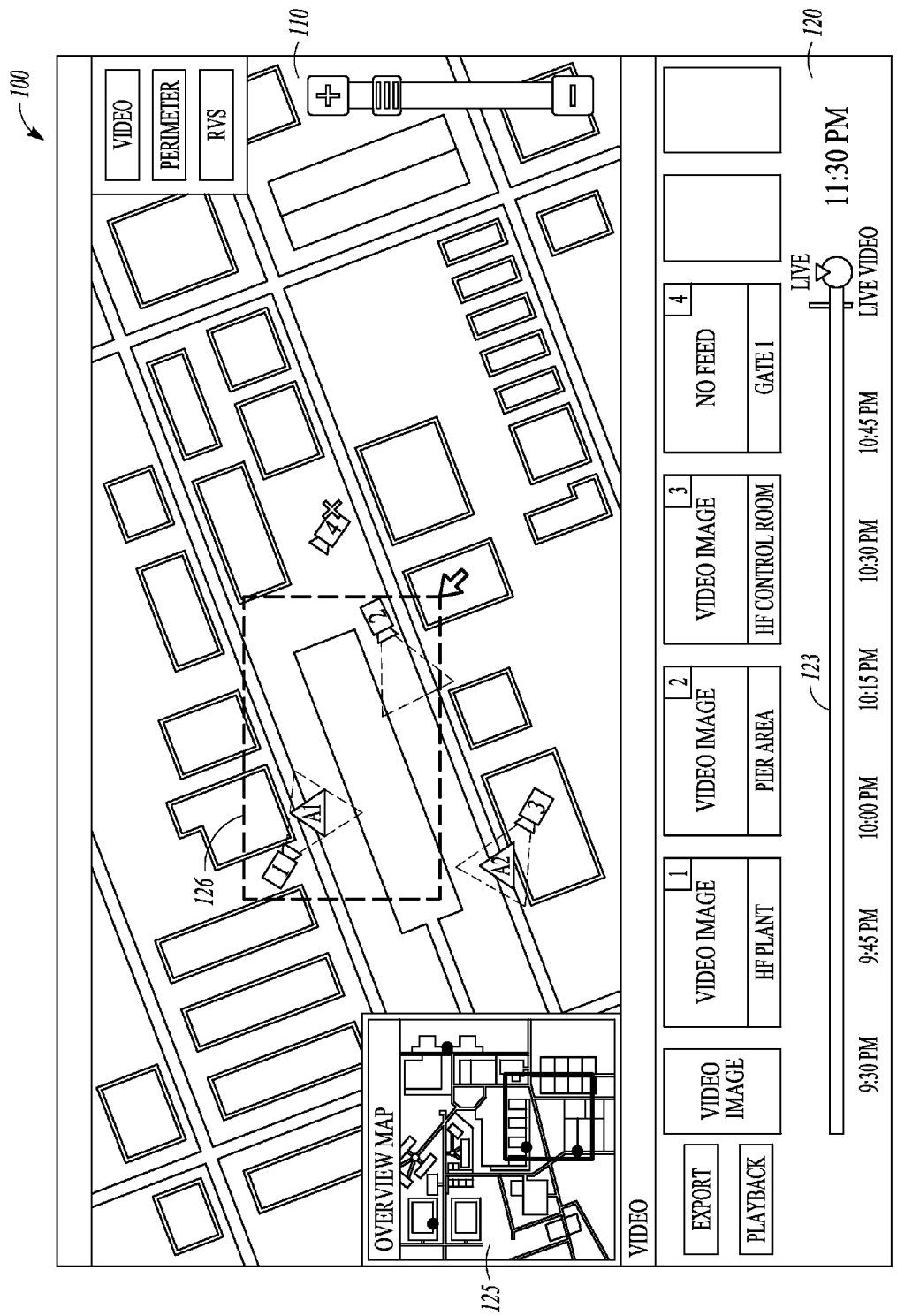
FIG. 5 illustrates an example embodiment of an output of a security monitoring system wherein a user can select multiple sensors by drawing a box around the sensor icons.

As noted, a user can interact with, track, and manipulate various types of sensors (e.g., video camera, RVS, perimeter, door lock, mobile sensor, etc.) and view the real-time data streams of the sensors. As illustrated in FIG. 4, a user can right-click on a sensor icon to display more information 127 about the sensor. To preview a sensor's data stream, the user can mouse-over a sensor icon on the map. To persistently show a sensor's data stream, the user is able to left-click on the sensor icon. The user is able to resize the window containing the data stream. As illustrated in FIG. 5, a user can select multiple sensors by drawing a box 126 around those sensors. A user can also drag and drop one or more sensors to view in the main display 110.

As noted above, a user is able to create customized groups of sensors by dragging sensor icons from the map-view to a specified group. In this manner, a user can customize the layout of the main display 110. The user can also add, delete, or move registered sensors on the map. For example, the user would be able to drag a sensor to the map from a library and place it in its correct location. Once added, the user can define each sensor to be visible or invisible on the user interface. A user is able to save his/her customized default user interface (UI) (e.g., default sensor groups, default docked components, default sensor parameters) within a configuration file, unload their configurations, and reload their configuration file at any time. Once the user's customized configuration file is reloaded, the UI will automatically update the customized camera parameters, groups, and docked components.

Figure 6:
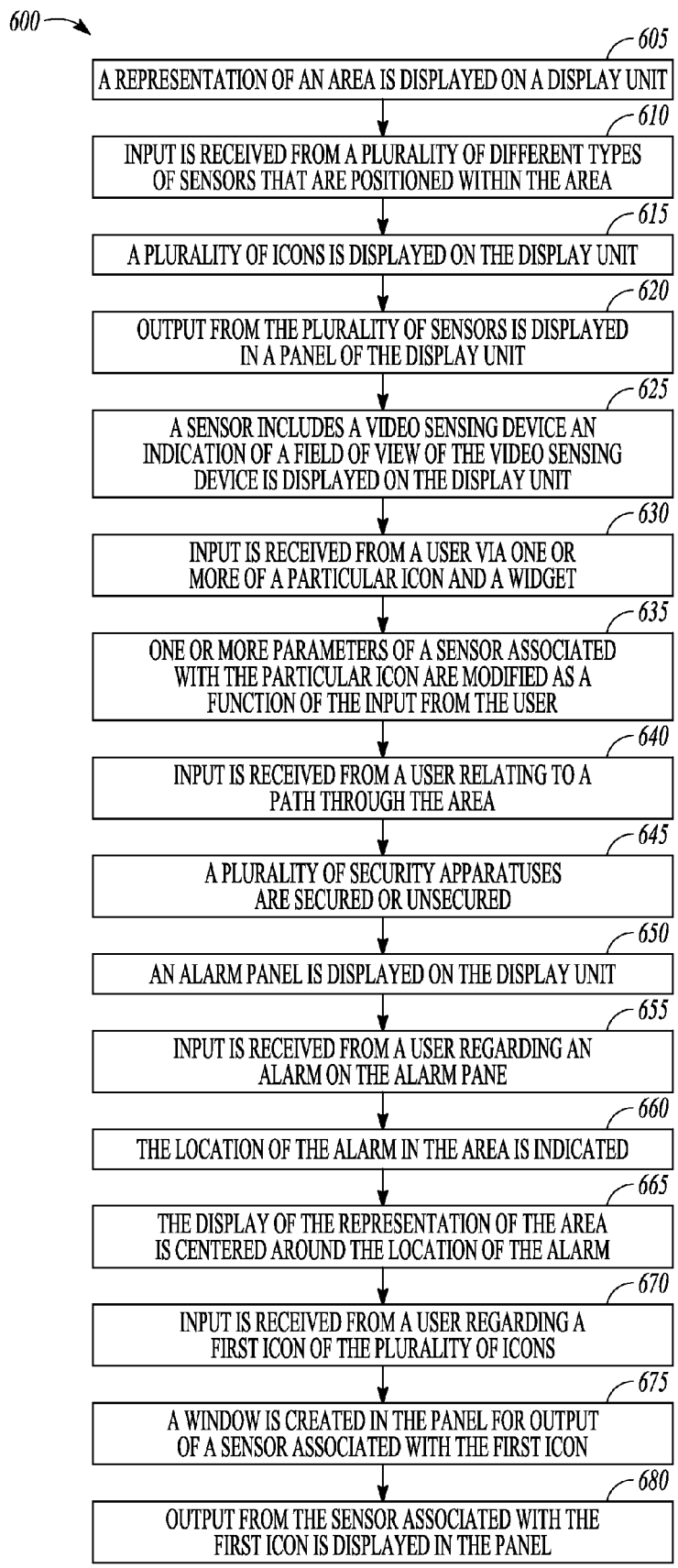
FIG. 6 illustrates a flowchart of an example embodiment of a process to improve situation awareness using information infusion

FIG. 6 illustrates a flowchart of a process 600 to improve situation awareness using information infusion. FIG. 6 includes a number of process blocks 605-680. Though arranged serially in the example of FIG. 6, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring to FIG. 6, at 605, a representation of an area is displayed on a display unit. At 610, input is received from a plurality of different types of sensors that are positioned within the area. At 615, a plurality of icons is displayed on the display unit. The plurality of icons represents the locations of the plurality sensors in the area. At 620, output from the plurality of sensors is displayed in a panel of the display unit.

At 625, a sensor includes a video sensing device an indication of a field of view of the video sensing device is displayed on the display unit. At 630, input is received from a user via one or more of a particular icon and a widget. At 635, one or more parameters of a sensor associated with the particular icon are modified as a function of the input from the user. At 640, input is received from a user relating to a path through the area. At 645, a plurality of security apparatuses are secured or unsecured.

At 650, an alarm panel is displayed on the display unit. At 655, input is received from a user regarding an alarm on the alarm panel. At 660, the location of the alarm in the area is indicated. At 665, the display of the representation of the area is centered around the location of the alarm. At 670, input is received from a user regarding a first icon of the plurality of icons. At 675, a window is created in the panel for output of a sensor associated with the first icon. At 680, output from the sensor associated with the first icon is displayed in the panel.

Figure 7:
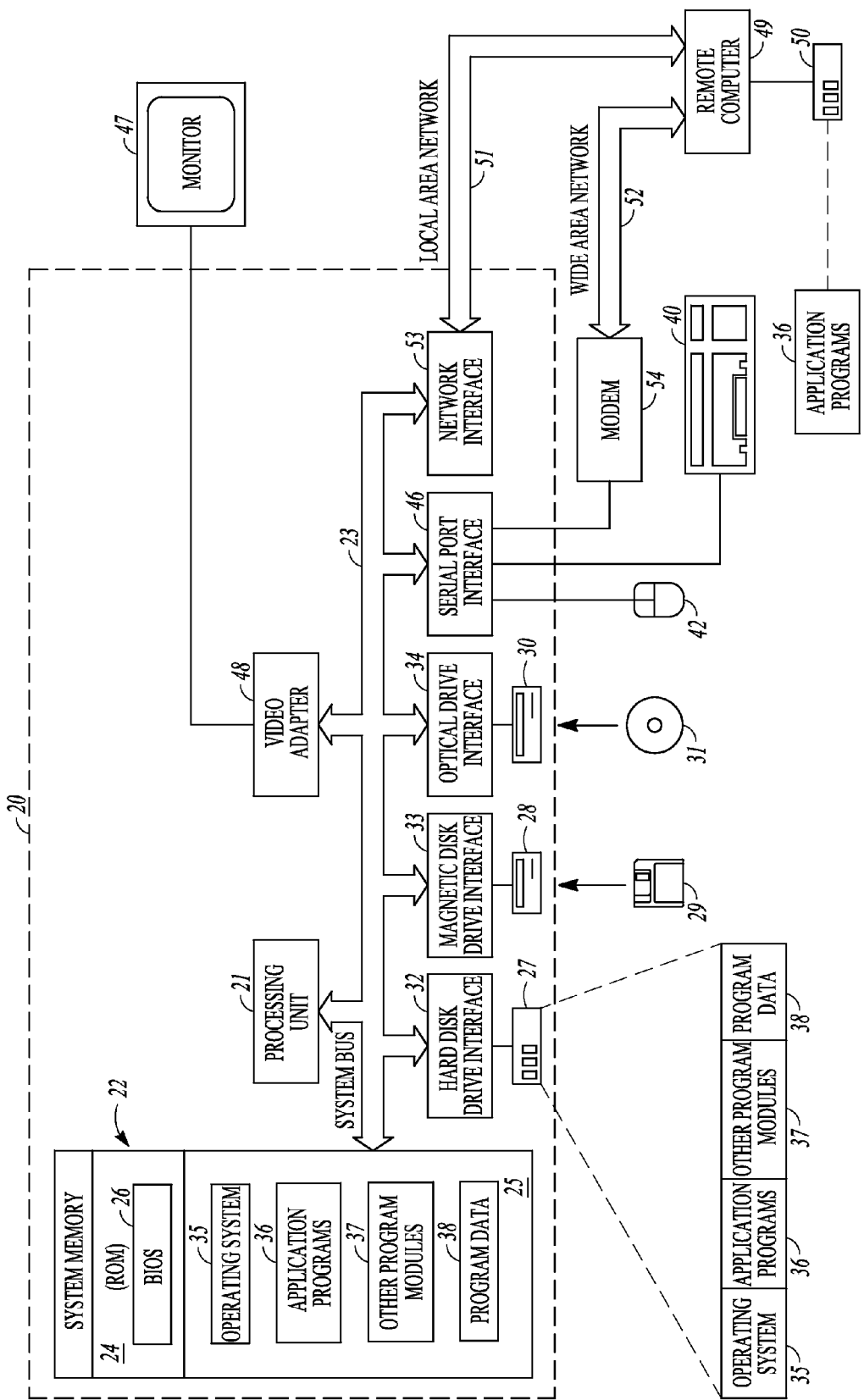
FIG. 7 is a block diagram of a computer system upon which one or more embodiments of the present disclosure can operate.

FIG. 7 is an overview diagram of a hardware and operating environment in conjunction with which embodiments of the invention may be practiced. The description of FIG. 7 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 7, a hardware and operating environment is provided that is applicable to any of the servers and/or remote clients shown in the other Figures.

As shown in FIG. 7, one embodiment of the hardware and operating environment includes a general purpose computing device in the form of a computer 20 (e.g., a personal computer, workstation, or server), including one or more processing units 21, a system memory 22, and a system bus 23 that operatively couples various system components including the system memory 22 to the processing unit 21. There may be only one or there may be more than one processing unit 21, such that the processor of computer 20 comprises a single central-processing unit (CPU), or a plurality of processing units, commonly referred to as a multiprocessor or parallel-processor environment. A multiprocessor system can include cloud computing environments. In various embodiments, computer 20 is a conventional computer, a distributed computer, or any other type of computer.

The system bus 23 can be any of several types of bus structures including a memory bus or memory controller, a peripheral bus, and a local bus using any of a variety of bus architectures. The system memory can also be referred to as simply the memory, and, in some embodiments, includes read-only memory (ROM) 24 and random-access memory (RAM) 25. A basic input/output system (BIOS) program 26, containing the basic routines that help to transfer information between elements within the computer 20, such as during start-up, may be stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 couple with a hard disk drive interface 32, a magnetic disk drive interface 33, and an optical disk drive interface 34, respectively. The drives and their associated computer-readable media provide non volatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), redundant arrays of independent disks (e.g., RAID storage devices) and the like, can be used in the exemplary operating environment.

A plurality of program modules can be stored on the hard disk, magnetic disk 29, optical disk 31, ROM 24, or RAM 25, including an operating system 35, one or more application programs 36, other program modules 37, and program data 38. A plug in containing a security transmission engine for the present invention can be resident on any one or number of these computer-readable media.

A user may enter commands and information into computer 20 through input devices such as a keyboard 40 and pointing device 42. Other input devices (not shown) can include a microphone, joystick, game pad, satellite dish, scanner, or the like. These other input devices are often connected to the processing unit 21 through a serial port interface 46 that is coupled to the system bus 23, but can be connected by other interfaces, such as a parallel port, game port, or a universal serial bus (USB). A monitor 47 or other type of display device can also be connected to the system bus 23 via an interface, such as a video adapter 48. The monitor 40 can display a graphical user interface for the user. In addition to the monitor 40, computers typically include other peripheral output devices (not shown), such as speakers and printers.

The computer 20 may operate in a networked environment using logical connections to one or more remote computers or servers, such as remote computer 49. These logical connections are achieved by a communication device coupled to or a part of the computer 20; the invention is not limited to a particular type of communications device. The remote computer 49 can be another computer, a server, a router, a network PC, a client, a peer device or other common network node, and typically includes many or all of the elements described above I/0 relative to the computer 20, although only a memory storage device 50 has been illustrated. The logical connections depicted in FIG. 7 include a local area network (LAN) 51 and/or a wide area network (WAN) 52. Such networking environments are commonplace in office networks, enterprise-wide computer networks, intranets and the internet, which are all types of networks.

When used in a LAN-networking environment, the computer 20 is connected to the LAN 51 through a network interface or adapter 53, which is one type of communications device. In some embodiments, when used in a WAN-networking environment, the computer 20 typically includes a modem 54 (another type of communications device) or any other type of communications device, e.g., a wireless transceiver, for establishing communications over the wide-area network 52, such as the internet. The modem 54, which may be internal or external, is connected to the system bus 23 via the serial port interface 46. In a networked environment, program modules depicted relative to the computer 20 can be stored in the remote memory storage device 50 of remote computer, or server 49. It is appreciated that the network connections shown are exemplary and other means of, and communications devices for, establishing a communications link between the computers may be used including hybrid fiber-coax connections, T1-T3 lines, DSL's, OC-3 and/or OC-12, TCP/IP, microwave, wireless application protocol, and any other electronic media through any suitable switches, routers, outlets and power lines, as the same are known and understood by one of ordinary skill in the art.

Example Embodiments

In Example No. 1, a system includes one or more computer processors that are configured to display a representation of an area on a display unit; receive input from a plurality of different types of sensors that are positioned within the area; display a plurality of icons on the display unit, the plurality of icons representing the locations of the plurality sensors in the area; and display in a panel on the display unit output from the plurality of sensors.

Example No. 2 includes the features of Example No. 1 and optionally includes a system wherein a sensor comprises a video sensing device, and comprising a computer processor configured to display on the display unit an outline of a field of view of the video sensing device.

Example No. 3 includes the features of Example Nos. 1-2 and optionally includes a system wherein the computer processor is configured to display one or more of a pan, a tilt, a zoom, a measure of the field of view, and a height of the video sensing device upon a user selecting the icon associated with the video sensing device.

Example No. 4 includes the features of Example Nos. 1-3 and optionally includes a system wherein a sensor comprises one or more of a perimeter sensor, a radar-based sensor, and a motion sensor.

Example No. 5 includes the features of Examples Nos. 1-4 and optionally includes a computer processor configured to receive input from a user via one or more of a particular icon and a widget; and modify one or more parameters of a sensor associated with the particular icon as a function of the input from the user.

Example No. 6 includes the features of Example Nos. 1-5 and optionally includes a plurality of security apparatuses; a computer processor configured to receive input from a user relating to a path through the area; and a computer processor configured to secure or unsecure the plurality of security apparatuses.

Example No. 7 includes the features of Example Nos. 1-6 and optionally includes a system wherein the securing or unsecuring of the plurality of security apparatuses occurs in a timed sequence as a function of a traversal of the path.

Example No. 8 includes the features of Example Nos. 1-7 and optionally includes a system wherein the representation comprises one or more of a map, a plan view, an aerial photograph, and a three dimensional representation.

Example No. 9 includes the features of Example Nos. 1-8 and optionally includes a system wherein a plurality of outputs from the sensors are displayed in the panel, and comprising a processor configured to receive input from a user to allow a user to scroll horizontally through the plurality of sensor outputs.

Example No. 10 includes the features of Example Nos. 1-9 and optionally includes a computer processor configured to receive input from a user and to permit the user to place one or more sensors into a group.

Example No. 11 includes the features of Example Nos. 1-10 and optionally includes a computer processor configured to display on the display unit an alarm panel, to receive input from a user regarding an alarm on the alarm panel, to indicate the location of the alarm in the area, and to center the display of the representation of the area around the location of the alarm.

Example No. 12 includes the features of Example Nos. 1-11 and optionally includes a processor configured to receive input from a user that enables the user to navigate the area on the display unit.

Example No. 13 includes the features of Example Nos. 1-12 and optionally includes a processor configured to receive input from a user regarding a first icon of the plurality of icons, to create a window in the panel for output of a sensor associated with the first icon, and to display in the panel output from the sensor associated with the first icon.

Example No. 14 includes a computer readable medium comprising instructions that when executed by a processor executes a process comprising displaying a representation of an area on a display unit; receiving input from a plurality of different types of sensors that are positioned within the area; displaying a plurality of icons on the display unit, the plurality of icons representing the locations of the plurality sensors in the area; and displaying in a panel on the display unit output from the plurality of sensors.

Example No. 15 includes the features of Example No. 14 and optionally includes a sensor comprising a video sensing device, and comprising instructions for displaying on the display unit an indication of a field of view of the video sensing device.

Example No. 16 includes the features of Example Nos. 14-15 and optionally includes instructions for receiving input from a user via one or more of a particular icon and a widget; and modifying one or more parameters of a sensor associated with the particular icon as a function of the input from the user.

Example No. 17 includes the features of Example Nos. 14-16 and optionally includes instructions for receiving input from a user relating to a path through the area; and securing or unsecuring a plurality of security apparatuses.

Example No. 18 includes the features of Example Nos. 14-17 and optionally includes instructions for displaying on the display unit an alarm panel, receiving input from a user regarding an alarm on the alarm panel, indicating the location of the alarm in the area, and centering the display of the representation of the area around the location of the alarm.

Example No. 19 includes the features of Example Nos. 14-18 and optionally includes instructions for receiving input from a user regarding a first icon of the plurality of icons, creating a window in the panel for output of a sensor associated with the first icon, and displaying in the panel output from the sensor associated with the first icon.

Example No. 20 includes a process including displaying a representation of an area on a display unit; receiving input from a plurality of different types of sensors that are positioned within the area; displaying a plurality of icons on the display unit, the plurality of icons representing the locations of the plurality sensors in the area; and displaying in a panel on the display unit output from the plurality of sensors.

Thus, an example system, method and machine readable medium for using information infusion to improve situation awareness have been described. Although specific example embodiments have been described, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate example embodiment.

The invention claimed is:

1. A system comprising:
   one or more computer processors configured to:
      display a representation of an area on a display unit;
      receive input from a plurality of different types of sensors;
      display a plurality of icons on the display unit, the plurality of icons representing one or more locations of the plurality of sensors and locations of a plurality of events detected in the area; and
      display in a panel on the display unit output from the plurality of sensors, wherein the panel comprises a sub-portion of the display unit and the panel comprises a plurality of windows, wherein each window is associated with a different sensor;
   a plurality of security apparatuses;
   a computer processor configured to receive input from a user relating to a path through the area; and
   a computer processor configured to secure or unsecure the plurality of security apparatuses.

2. The system of claim 1, wherein a sensor comprises a video sensing device, and comprising a computer processor configured to display on the display unit an icon representing the video sensing device and an outline of a field of view of the video sensing device, the outline comprising a closed line encompassing the field of view.

3. The system of claim 2, wherein the computer processor is configured to display numerical values relating to one or more of a pan, a tilt, a zoom, a measure of the field of view, and a height of the video sensing device upon a user selecting the icon associated with the video sensing device.

4. The system of claim 1, wherein a sensor comprises one or more of a perimeter sensor, a radar-based sensor, and a motion sensor.

5. The system of claim 1, comprising a computer processor configured to:
   receive input from a user via one or more of a particular icon and a widget, the icon or widget displayed on the display unit at the location of the sensor in the area; and
   manipulate one or more a pan, tilt, or zoom of a sensor associated with the particular icon as a function of the input from the user.

6. The system of claim 1, wherein the securing or unsecuring of the plurality of security apparatuses occurs in a timed sequence as a function of a traversal of the path.

7. The system of claim 1, wherein the representation comprises one or more of a map, a plan view, an aerial photograph, and a three dimensional representation.

8. The system of claim 1, wherein a plurality of outputs from the sensors are displayed in the panel, and comprising a processor configured to receive input from a user to allow a user to scroll horizontally or vertically through the plurality of sensor outputs.

9. The system of claim 1, comprising a computer processor configured to receive input from a user and to permit the user to place one or more sensors into a group, to drag and drop an alarm onto the display unit, to drag and drop sensor icons to the panel, and to drag and drop sensor icons into the group.

10. The system of claim 1, comprising a computer processor configured to display on the display unit an alarm panel, to receive input from a user regarding an alarm on the alarm panel, to indicate the location of the alarm in the area, and to center the display of the representation of the area around the location of the alarm.

11. The system of claim 1, comprising a processor configured to receive input from a user that enables the user to navigate the area on the display unit.

12. The system of claim 1, comprising a processor configured to receive input from a user regarding a first icon of the plurality of icons, to create a window in the panel for output of a sensor associated with the first icon, and to display in the panel output from the sensor associated with the first icon.

13. A non-transitory computer readable medium comprising instructions that when executed by a processor executes a process comprising:
   displaying a representation of an area on a display unit;
   receiving input from a plurality of different types of sensors;
   displaying a plurality of icons on the display unit, the plurality of icons representing one or more locations of the plurality of sensors in the area and locations of a plurality of events detected in the area;
   displaying in a panel on the display unit output from the plurality of sensors, wherein the panel comprises a sub-portion of the display unit and the panel comprises a plurality of windows, wherein each window is associated with a different sensor;
   receiving input from a user relating to a path through the area; and
   securing or unsecuring a plurality of security apparatuses.

14. The non-transitory computer readable medium of claim 13, wherein a sensor comprises a video sensing device, and comprising instructions for displaying on the display unit an indication representing the video sensing device and a field of view of the video sensing device, the indication comprising a closed line encompassing the field of view.

15. The non-transitory computer readable medium of claim 13, comprising instructions for:
   receiving input from a user via one or more of a particular icon and a widget, the icon or widget displayed on the display unit at the location of the sensor in the area; and
   modifying one or more parameters of a sensor associated with the particular icon as a function of the input from the user.

16. The non-transitory computer readable medium of claim 13, comprising instructions for displaying on the display unit an alarm panel, receiving input from a user regarding an alarm on the alarm panel, indicating the location of the alarm in the area, and centering the display of the representation of the area around the location of the alarm.

17. The non-transitory computer readable medium of claim 13, comprising instructions for receiving input from a user regarding a first icon of the plurality of icons, creating a window in the panel for output of a sensor associated with the first icon, and displaying in the panel output from the sensor associated with the first icon.

18. A method comprising:
   displaying a representation of an area on a display unit;
   receiving input from a plurality of different types of sensors that are positioned within the area;
   displaying a plurality of icons on the display unit, the plurality of icons representing locations of the plurality sensors in the area;
   displaying in a panel on the display unit output from the plurality of sensors, wherein the panel comprises a sub-portion of the display unit and the panel comprises a plurality of windows, wherein each window is associated with a different sensor;
   receiving input from a user relating to a path through the area; and
   securing or unsecuring a plurality of security apparatuses.

* * * * *